(12) United States Patent
Vandyke et al.

(10) Patent No.: US 11,897,616 B2
(45) Date of Patent: Feb. 13, 2024

(54) DRY ICE DRAW THROUGH GALLEY COOLING REFERENCE TO RELATED APPLICATIONS

(71) Applicant: The Boeing Company, Chicago, IL (US)

(72) Inventors: Bryce A. Vandyke, Snohomish, WA (US); Marcus K. Richardson, Bothell, WA (US); Chao-Hsin Lin, Redmond, WA (US)

(*) Notice: Subject to any disclaimer, the term of this patent is extended or adjusted under 35 U.S.C. 154(b) by 0 days.

(21) Appl. No.: 17/895,725

(22) Filed: Aug. 25, 2022

(65) Prior Publication Data

US 2023/0012539 A1 Jan. 19, 2023

Related U.S. Application Data

(60) Division of application No. 16/519,658, filed on Jul. 23, 2019, now Pat. No. 11,440,662, which is a continuation of application No. 14/202,366, filed on Mar. 10, 2014, now Pat. No. 10,407,173.

(51) Int. Cl.
| | | |
|---|---|---|
| B64D 11/04 | (2006.01) | |
| A47B 31/02 | (2006.01) | |
| B64D 11/00 | (2006.01) | |
| F25D 3/12 | (2006.01) | |

(52) U.S. Cl.
CPC ............. *B64D 11/04* (2013.01); *A47B 31/02* (2013.01); *B64D 11/0007* (2013.01); *F25D 3/125* (2013.01); *B62B 2204/04* (2013.01)

(58) Field of Classification Search
CPC ............... B64D 11/04; B64D 11/0007; B64D 2013/0629; A47B 31/02; F25D 3/125; F25D 19/003; F25D 11/003; B62B 2204/04

See application file for complete search history.

(56) References Cited

U.S. PATENT DOCUMENTS

| | | | | |
|---|---|---|---|---|
| 4,323,110 A * | 4/1982 | Rubbright | ............. | A47J 39/006 219/400 |
| 4,614,091 A * | 9/1986 | Frank | ...................... | F25D 3/125 62/119 |
| 5,491,979 A * | 2/1996 | Kull | ........................ | F25D 15/00 62/239 |
| 6,269,651 B1 * | 8/2001 | Price | ..................... | A47F 3/0404 62/255 |
| 2007/0107463 A1 * | 5/2007 | Schreiber | ................ | A23L 3/375 62/78 |
| 2010/0029190 A1 * | 2/2010 | Dessero | ................. | B64D 11/04 454/341 |
| 2014/0326603 A1 * | 11/2014 | Kamai | ................... | B01D 53/32 204/627 |

* cited by examiner

*Primary Examiner* — Frantz F Jules
*Assistant Examiner* — Martha Tadesse
(74) *Attorney, Agent, or Firm* — Felix L. Fischer

(57) ABSTRACT

A galley cart system employs a dry ice compartment and a refrigeration compartment in a galley cart in flow communication with the dry ice compartment. A ventilation system is in interruptible flow communication with at least the refrigeration compartment and configured to receive gas discharged from at least the refrigeration compartment.

20 Claims, 19 Drawing Sheets

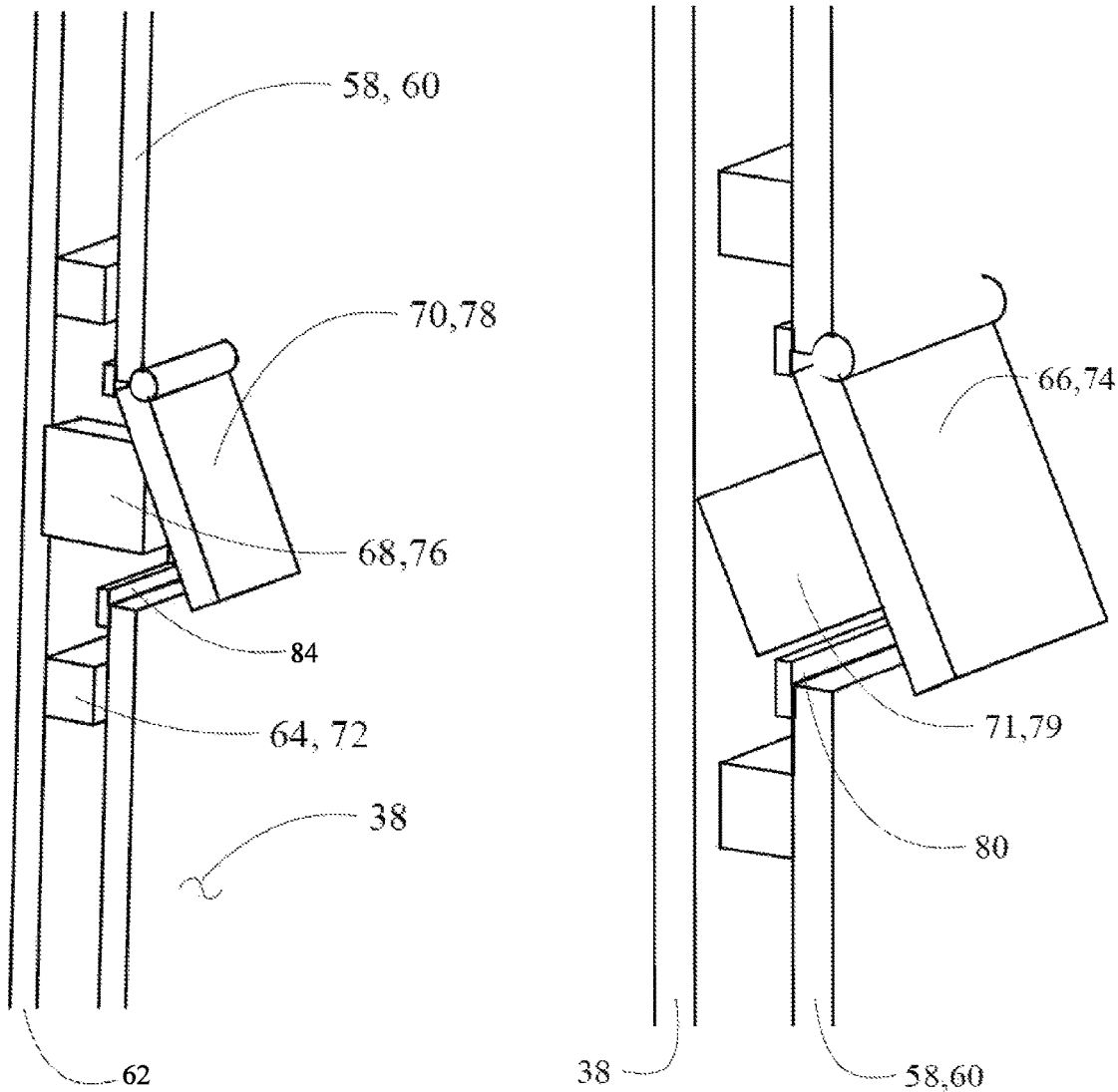

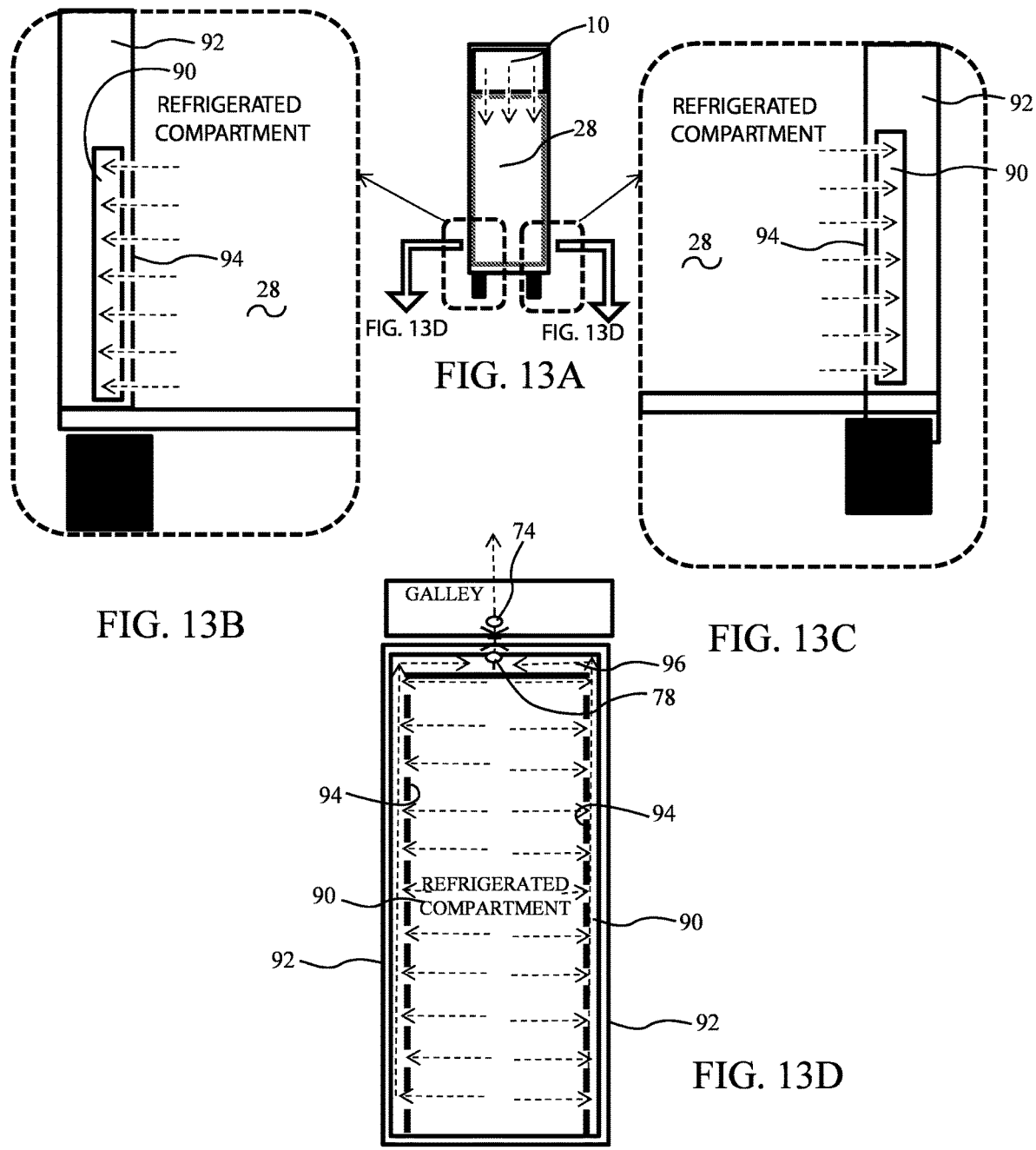

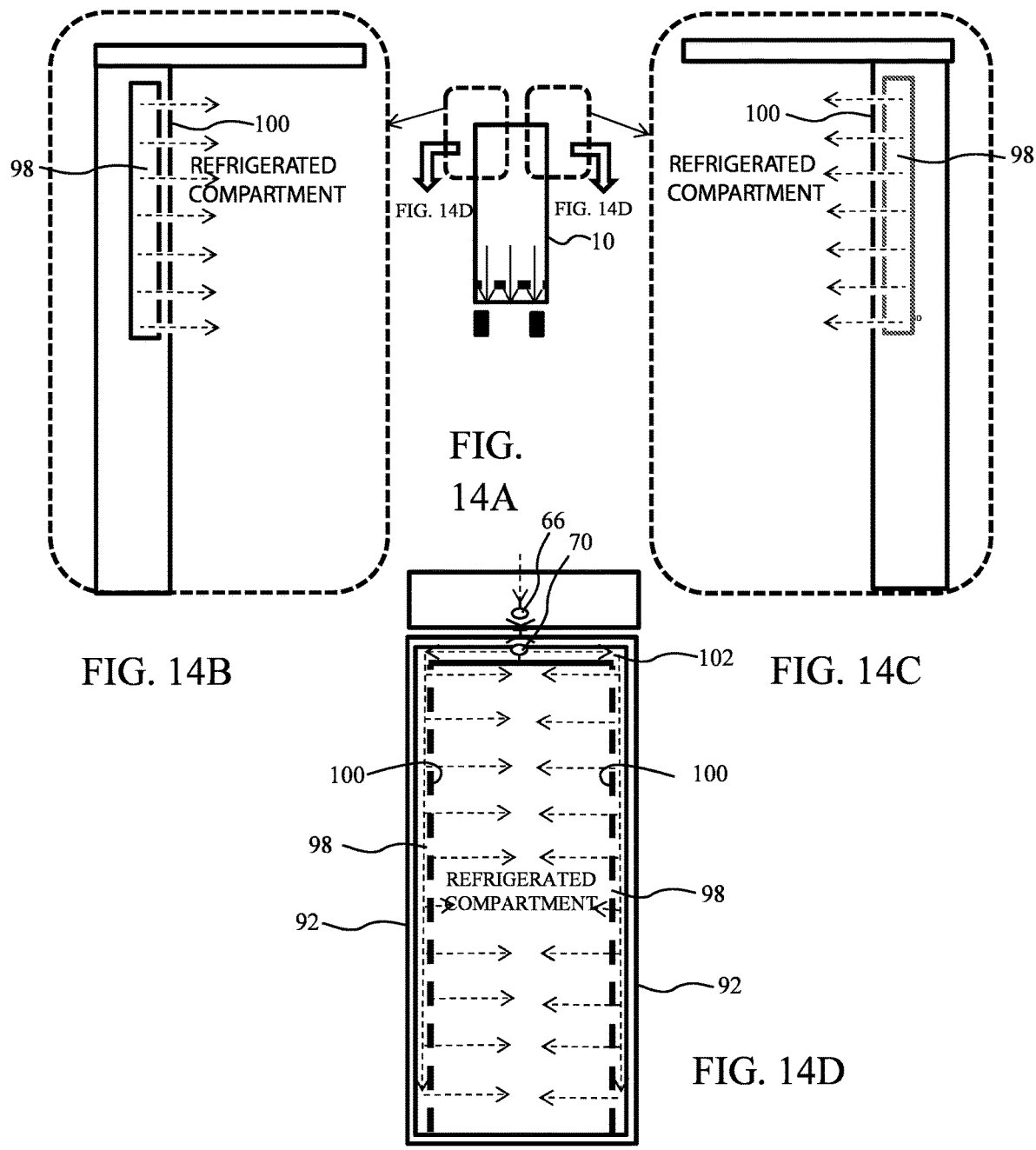

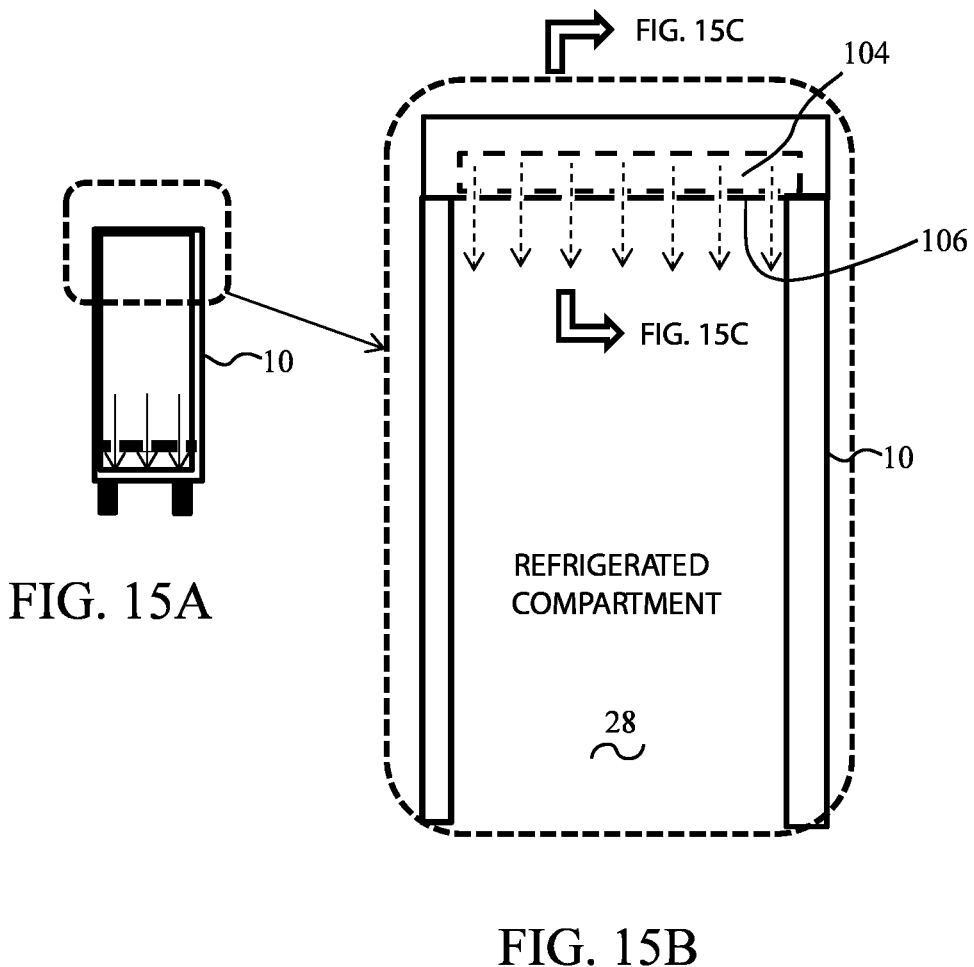
FIG. 15A
FIG. 15B
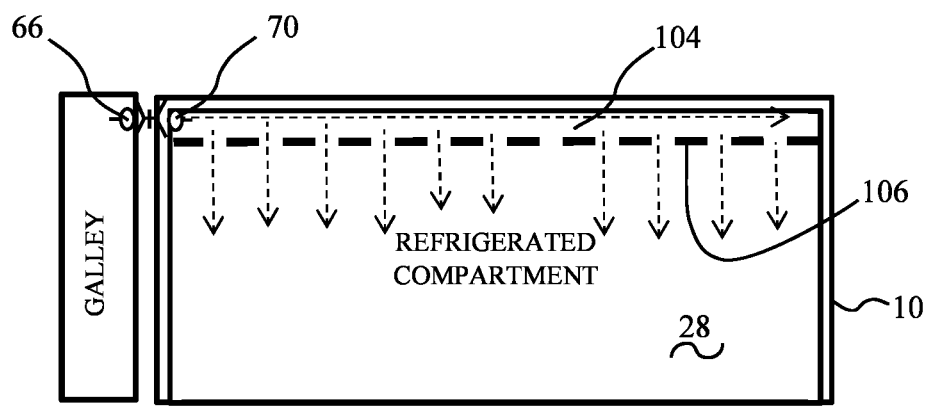
FIG. 15C

DRY ICE DRAW THROUGH GALLEY COOLING REFERENCE TO RELATED APPLICATIONS

REFERENCE TO RELATED APPLICATIONS

This application is a divisional application of U.S. application Ser. No. 16/519,658 filed on Jul. 23, 2019 which is a continuation of application Ser. No. 14/202,366 filed on Mar. 10, 2014 entitled DRY ICE DRAW THROUGH GALLEY COOLING now U.S. Pat. No. 10,407,173 having a common assignee with the present application, the disclosure of which is incorporated herein by reference.

BACKGROUND INFORMATION

Field

Embodiments of the disclosure relate generally to the galley cart systems for transportation vehicles and more particularly to embodiments for metering and venting dry ice sublimation from a dry ice compartment through a cart and into a vent system.

Background

Galley carts employed for food service in transportation vehicles such as aircraft and trains often require cooling to maintain food and beverages at a temperature that is cooler than a cabin of the vehicle. At least some known carts include or connect to a refrigeration system (a chiller) that provides cool air to an interior volume of the cart to cool the food/beverages. However, the chiller is powered by the vehicle systems, reducing the amount of power available to the vehicle for propulsion, thrust, etc. As such, the chiller is an inefficient draw on the power supply system of the vehicle. Further, such a chiller system adds weight and complexity to the vehicle. Accordingly, some galley carts are configured to contain dry ice that cools the food/beverages as it sublimates. One drawback with the use of dry ice is the carbon dioxide gas ($CO_2$) sublimate that is released. At least in aircraft, the Federal Aviation Administration has set forth requirements for the maximum $CO_2$ concentration in a cabin of the aircraft. The sublimation of the dry ice may cause the $CO_2$ concentration to exceed the maximum parts-per-million (ppm). For example, the $CO_2$ may escape from the cart into the cabin when the door of the cart is opened in the galley area or in the aisle as food/beverages are served (a transient condition). Further, the $CO_2$ may escape from the cart through provided leak paths to ensure that the pressure within the cart does not exceed a maximum threshold as the dry ice sublimates (a steady-state condition). Dry ice, providing $CO_2$ sublimation as a coolant, is a commonly available, cost effective and volumetrically efficient refrigerant for such use. However, metering of the sublimation and venting of $CO_2$ from the galley carts to provide consistent and proper cooling and to avoid undesirable buildup of $CO_2$ in passenger compartments is preferred.

It is therefore desirable to provide structurally simple and cost effective metering and venting systems for $CO_2$ sublimation in galley carts. Additionally, it is desirable to provide effective mating systems for galley carts with on board galleys for efficient external venting of $CO_2$.

SUMMARY

Exemplary embodiments provide a galley cart system having a dry ice compartment and a refrigeration compartment in a galley cart in flow communication with the dry ice compartment. A ventilation system is in interruptible flow communication with at least the refrigeration compartment and configured to receive gas discharged from at least the refrigeration compartment.

The features, functions, and advantages that have been discussed can be achieved independently in various embodiments of the present invention or may be combined in yet other embodiments further details of which can be seen with reference to the following description and drawings.

BRIEF DESCRIPTION OF THE DRAWINGS

FIG. 11 is a section perspective view from within the cart showing the cart vent interface door actuated by the engagement element to the open position;

FIG. 12 is a section perspective view from within the galley vent showing the galley vent interface door actuated by the integral engagement element acting on the cart rear wall to the urge the door to the open position;

FIG. 13A is a front section view of the galley cart of the first embodiment identifying portions for detailed views;

FIG. 13B is a left detailed view of the lower left corner of the cart of FIG. 13A;

FIG. 13C is a right detailed view of the lower right corner of the cart of FIG. 13A;

FIG. 13D is a section view along lines FIG. 13D-FIG. 13D in FIG. 13A;

FIG. 14A is a front section view of the galley cart of the second embodiment identifying portions for detailed views:

FIG. 14B is a left detailed view of the upper left corner of the cart of FIG. 13A;

FIG. 14C is a right detailed view of the upper right corner of the cart of FIG. 13A;

FIG. 14D is a section view along lines FIG. 14D-FIG. 14D in FIG. 14A;

FIG. 15A is a front section view of the galley cart of the second embodiment identifying portions for detailed views;

FIG. 15B is a front detailed section view of the top portion of the cart of FIG. 15A;

FIG. 15C is a side detailed section view of the top portion of the cart as identified by lines FIG. 15C-FIG. 15C in FIG. 15B;

DETAILED DESCRIPTION

Figure 1A:
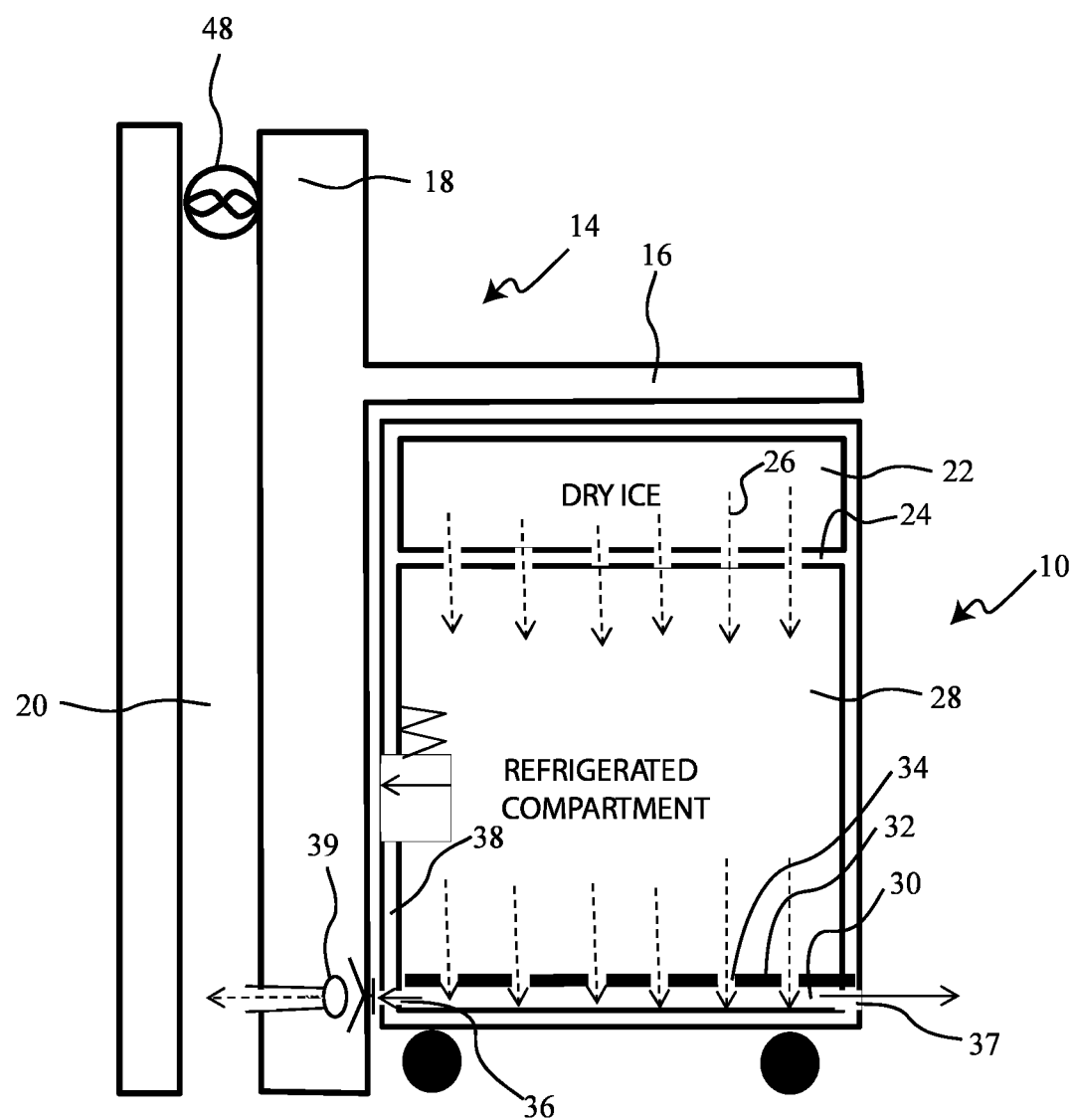
FIG. 1A is a schematic side section view of a first embodiment having an integral dry ice compartment in a galley cart as engaged in the galley.

The embodiments described herein provide venting of CO2 from a dry ice compartment (i.e. a dry ice compartment in a galley cart or galley dry ice compartment) to prevent CO2 from building up in the galley and/or to prevent over-pressurization in the cart refrigeration compartment or dry ice compartment. The distribution system within the cart and the venting system also facilitates more uniform distribution of CO2 across the height and depth of the cart volume because an outlet vent is positioned at the bottom of the cart volume. The system includes a ventilation system (i.e., ducting) within the galley. The ventilation system is in interruptible flow communication with the cart refrigeration compartment and is configured to receive discharged gas via at least a first valve near a bottom of the compartment. A dry ice compartment is also in flow communication with the cart refrigeration compartment such that sublimated gas flows from the dry ice compartment into the compartment. The gas sublimated from the dry ice is referred to herein as "CO2 sublimate", "cold sublimate", "sublimated gas", and/or "sublimate".

The dry ice compartment can be a compartment at the top of a galley cart, where the dry ice compartment and the refrigeration compartment are both within a housing of the galley cart. Alternatively, the dry ice compartment can be a compartment, such as a drawer, within the galley above a volume or bay where a galley cart is stored. In the first embodiment, the sublimated gas flows directly from the dry ice compartment into the cart refrigeration compartment. In the second embodiment, the sublimated gas flows into the ventilation system, then into the cart refrigeration compartment via a second valve near a top of the cart. Further, in such an embodiment, a pressure relief valve is positioned in the ventilation system downstream from the second valve and upstream from the first valve. In examples of either embodiment as described herein, the first and second valves are door valves that are currently used in galleys to provide a pressure change leak path, but the valves can be any suitable valves. Flow distribution of CO2 sublimate, both for introduction into the refrigeration compartment and for venting from the refrigeration compartment, is controlled in various embodiments with horizontal or vertical grids with an array of apertures.

Additionally, a duct network to the galley ventilation system may be connected to either an existing lavatory/galley exhaust system, a wastewater system, to surfaces which would benefit from local cooling or to cooling the cabin supply air. The described embodiments take advantage of connection points which already provide suction. The wastewater system and lavatory/galley exhaust system provide mechanically induced suction by a fan or pump. A ram air circuit typical for cabin cooling provides a flow driven suction. Alternatively, the venting CO2 may be employed to provide additional thrust through the ram air circuit. Routing of the CO2 vent ducting to the air conditioning pack bay may utilize the cabin pressurization system to drive the gas. Additionally the CO2 gas produced may be utilized for cooling or sanitizing of existing systems, such as the wastewater system.

Referring to the drawings, FIG. 1A shows a first embodiment employing a galley cart 10 receivable within a galley cart storage area 12 in the galley 14 of a transportation vehicle. For the embodiments herein, description will be with respect to an aircraft. However, similar construction and embodiments may be employed in any commercial transportation vehicle such as a train, aircraft, ship or bus. A basic aircraft galley with minimal structural profile to allow maximized passenger seating with minimal intrusion by the galley employs a simple work counter 16 under which the galley cart storage area 12 is present. A wall 18 of the galley is employed for routing of a duct as a vent 20, as will be described in greater detail subsequently, which may be a portion of a galley ventilation system. In FIG. 1A the duct for vent 20 is represented notionally as exiting upward but may be vented laterally in alternative embodiments.

Figure 2:
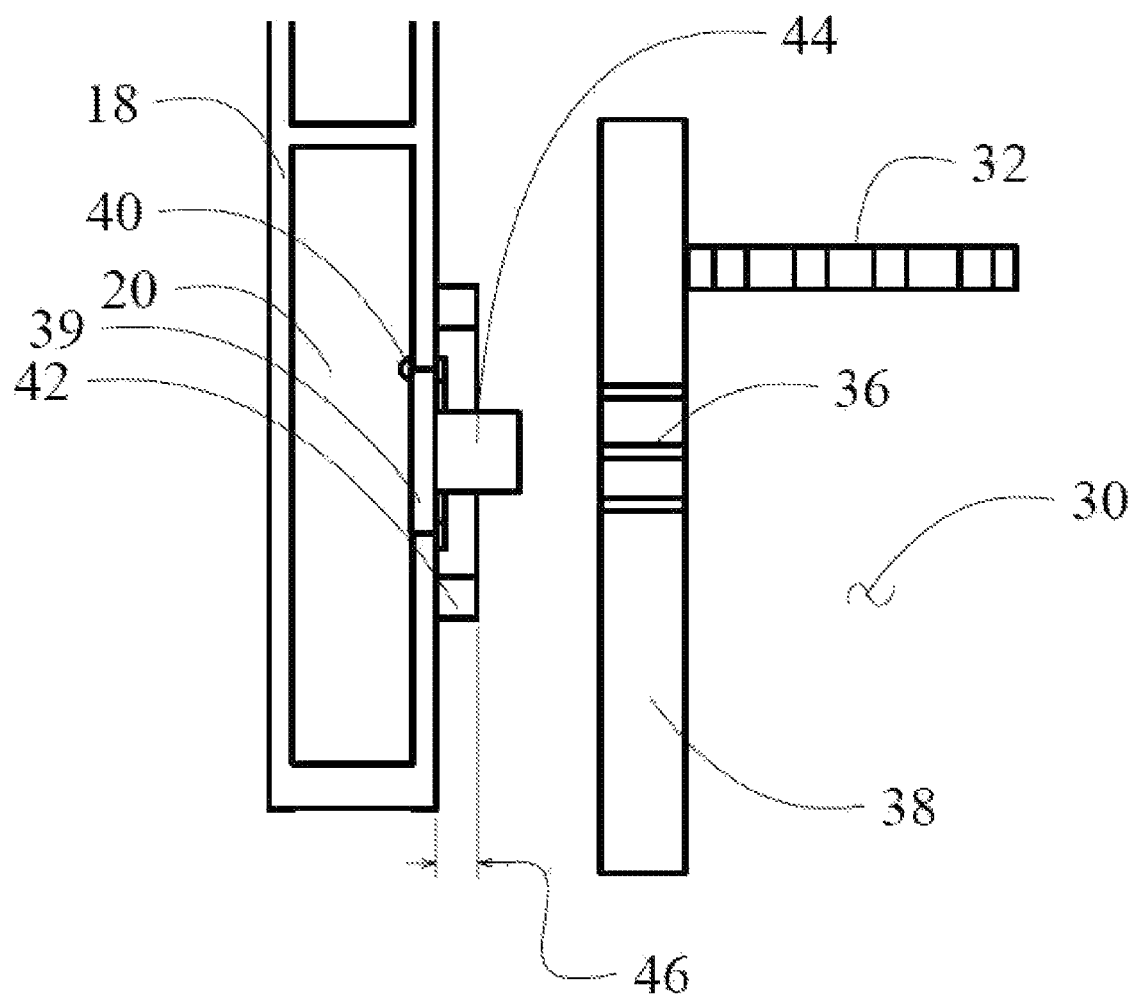
FIG. 2 is a side section detailed view of a vent interface between the cart and galley vent with the cart in a disengaged position.
Figure 3:
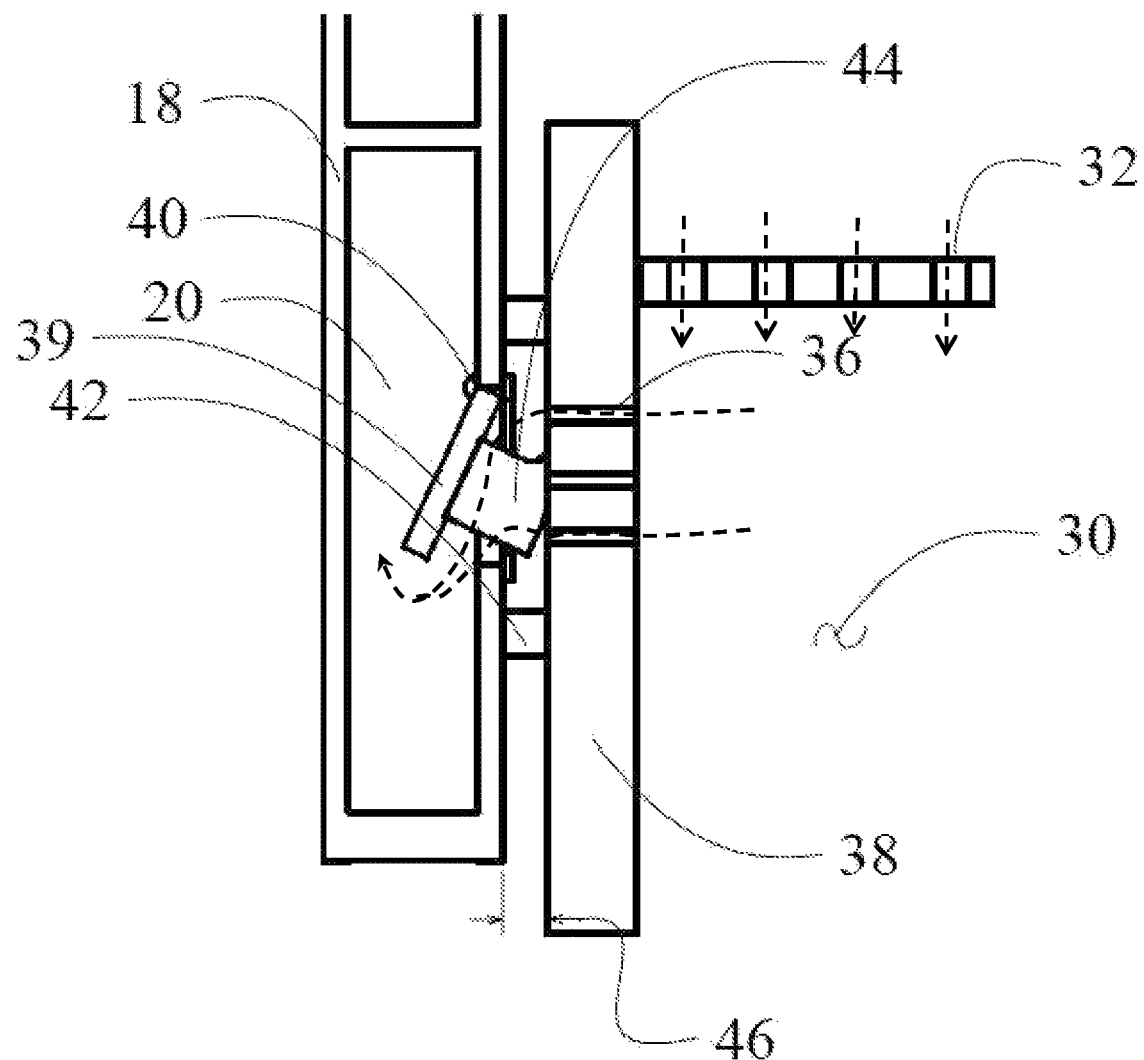
FIG. 3 is a side section detailed view of the vent interface between the cart and galley vent with the cart in an engaged position.

The galley cart 10 incorporates an integral dry ice compartment 22 within the housing of the cart which may be in the form of a drawer accessed from the front of the cart or a chamber accessed by a hinged lid on the cart. A lower wall 24 in the compartment 22 has perforations or other flow conduits to allow CO2 sublimate from dry ice represented by dashed arrows 26 to enter a refrigeration compartment 28 contained with the dry ice compartment in a common housing. Flow of CO2 will be represented by dashed arrows in the drawings herein. Example flow control systems for the sublimating CO2 are described in application Ser. No. 14/202,495 filed on Mar. 10, 2014 entitled Controlling Flow of Dry Ice Sublimation Inside a Galley Cart now U.S. Pat. No. 9,340,288 which is incorporated herein by reference. Galley cart 10 incorporates into a bottom portion of the housing a chamber or metering sublimation pocket 30 which may incorporate a grate 32 having holes 34 configured to receive sublimation gas from and sized to meter the sublimation flow through the refrigeration compartment 28 at a predetermined rate. Grate 32 may be eliminated in certain alternative embodiments. A metering vent 36 is present in a rear wall 38 of the cart 10 in flow communication with the pocket 30 for metering sublimation gas from the galley cart. A companion or alternative metering vent 37 may be provided in a front wall of the cart or as a portion of a door to the cart. The metered vent 36 is sized to provide an acceptable flow rate of about 0.4 lbm/hr which results in a total area of the vent apertures of between 0.02 and 0.05 in² allowing flow into a passenger cabin in the aircraft and is positioned for interface with a galley vent door 39 as seen in FIGS. 2 and 3 with the cart docked in the galley. The vent door 39 is in flow communication with the ventilation system. Metering of the sublimation through the holes 34 in the grate 32 of the pocket 30 and the metering vent 36 maintains a desired amount of sublimate in the refrigeration compartment for maintaining the desired temperature in the compartment to provide cooling of the contents.

Figure 1B:
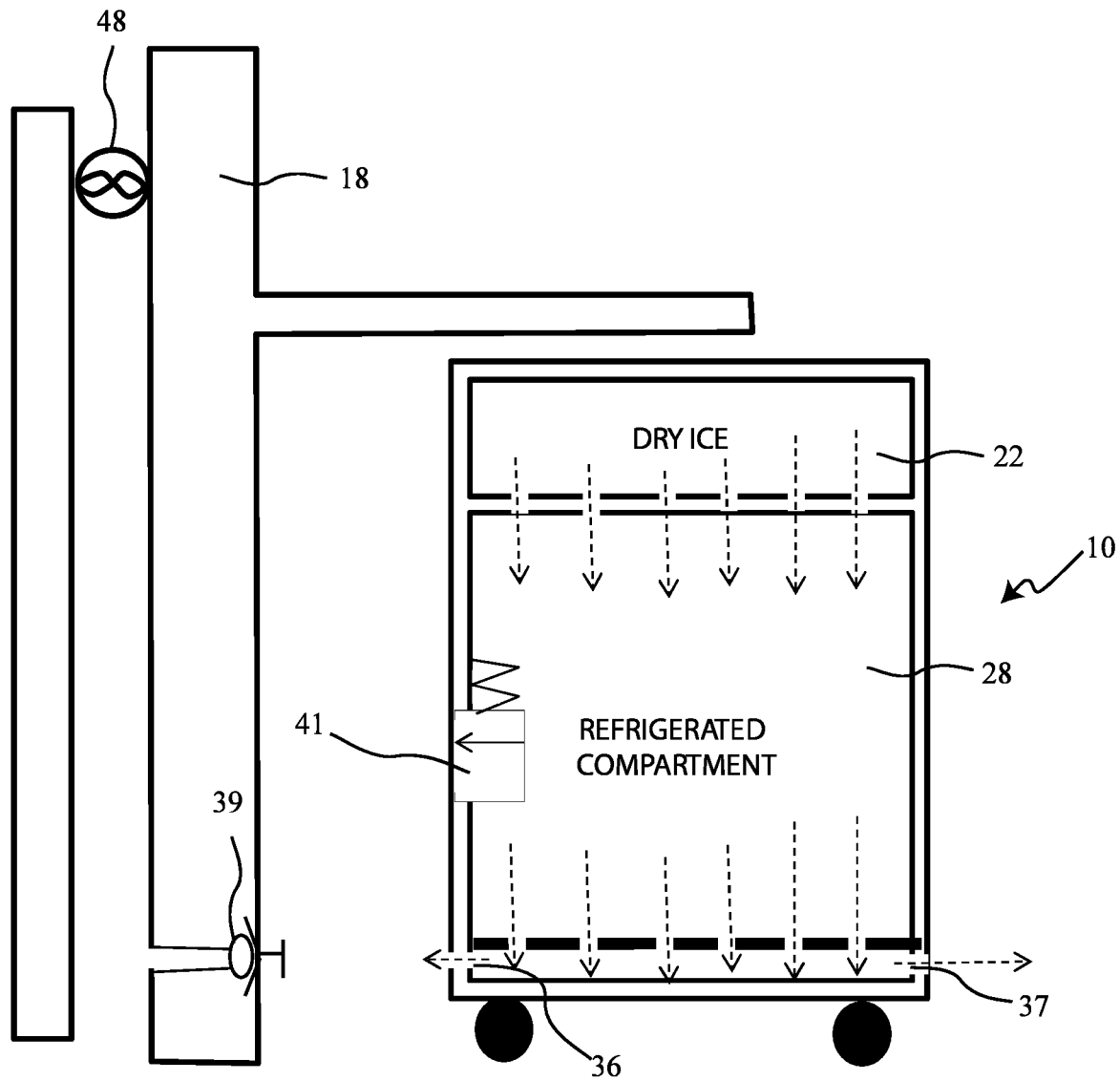
FIG. 1B is a schematic side section view of the first embodiment disengaged from the galley.
Figure 1C:
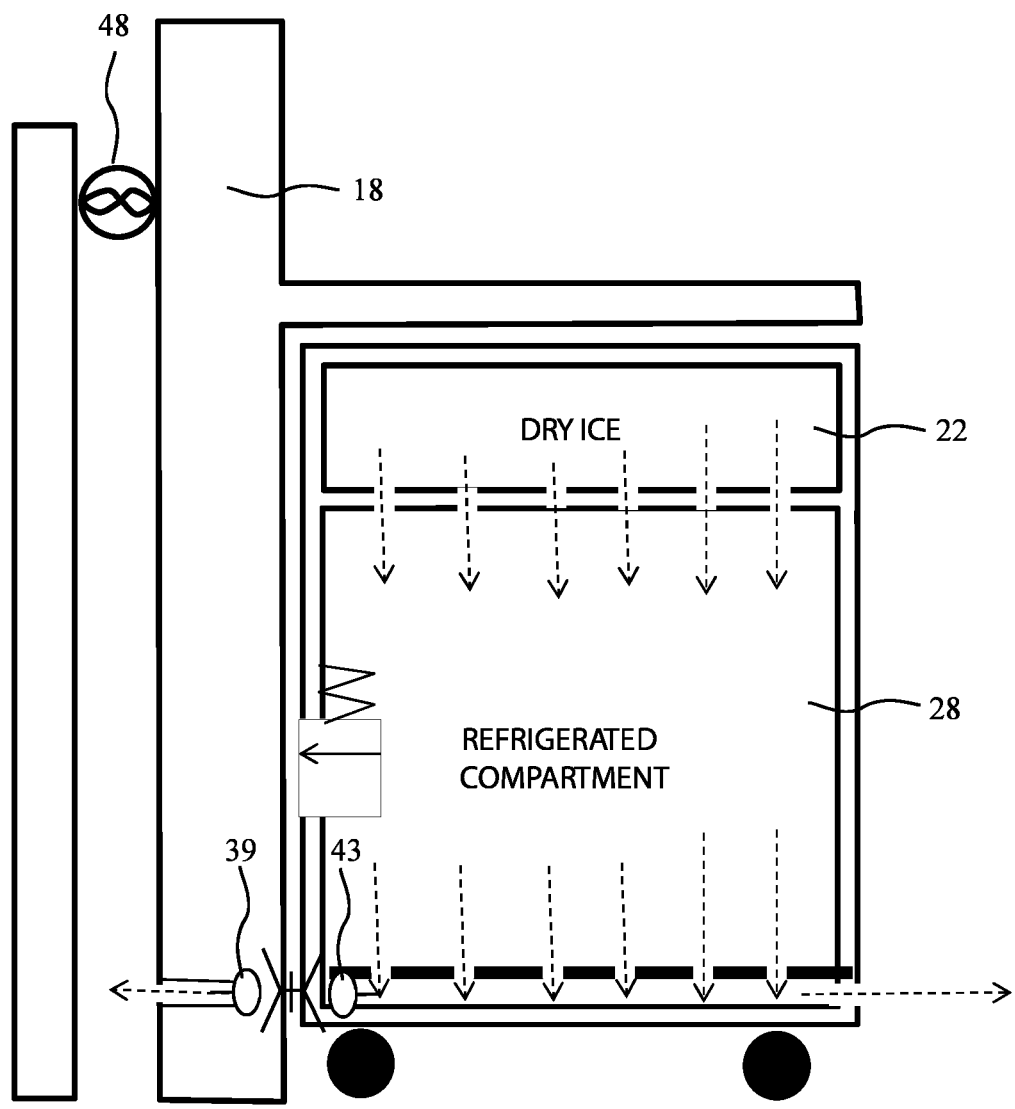
FIG. 1C is a schematic side view of the first embodiment with a companion vent door in the cart.

As shown in FIG. 1B, when the cart is disengaged from the galley, vent door 39 is closed and vents 36 and/or 37 provide venting of CO2 sublimate from the cart. An excess pressure relief valve 41 may be provided in the cart in communication with the refrigeration compartment 28 or dry ice storage compartment 22. A companion vent door 43 may be provided in the cart for interface with the galley vent door 39 as shown schematically in FIG. 1C and will be described in detail with respect to subsequent embodiments. As seen in FIGS. 2 and 3, the metered vent 36 may be one or more simple holes in the back wall 38 of the cart 10 allowing a flow path from the pocket 30. As the cart 10 is docked into the cart storage area 12, the rear wall 38 is urged toward the galley wall 18. As shown in FIG. 2, the galley wall incorporates a vent door 39 suspended by a hinge 40. The vent door is in flow communication with the vent duct 20 which may be interconnected with the galley and lavatory vent ducts in the aircraft or to alternative systems as will be described subsequently. A peripheral seal 42 surrounds the door 39. A bumper 44 extends from the door with an offset 46 sufficient to provide a contact distance for the cart rear wall 38 before the wall engages the peripheral seal 42. As shown in FIG. 3 when the cart rear wall 38 is urged against the seal 42, the bumper 44 engages the cart rear wall and urges the door 39 into an open position. Sublimation flow is then received from the pocket 30 in the cart through the metering vent 36 through the open door 39 into the vent 20. When the cart is disengaged from the galley, bumper 44 is released from the cart rear wall 38 and door 39 closes. The ventilation system may include a fan 48 in the vent 20 (seen in FIGS. 1A and 1B) to provide pressure differential for ejecting the sublimation flow from the vent to the exterior of the aircraft. While a single fan is shown, duplicate fans for reliability may be employed.

Figure 4A:
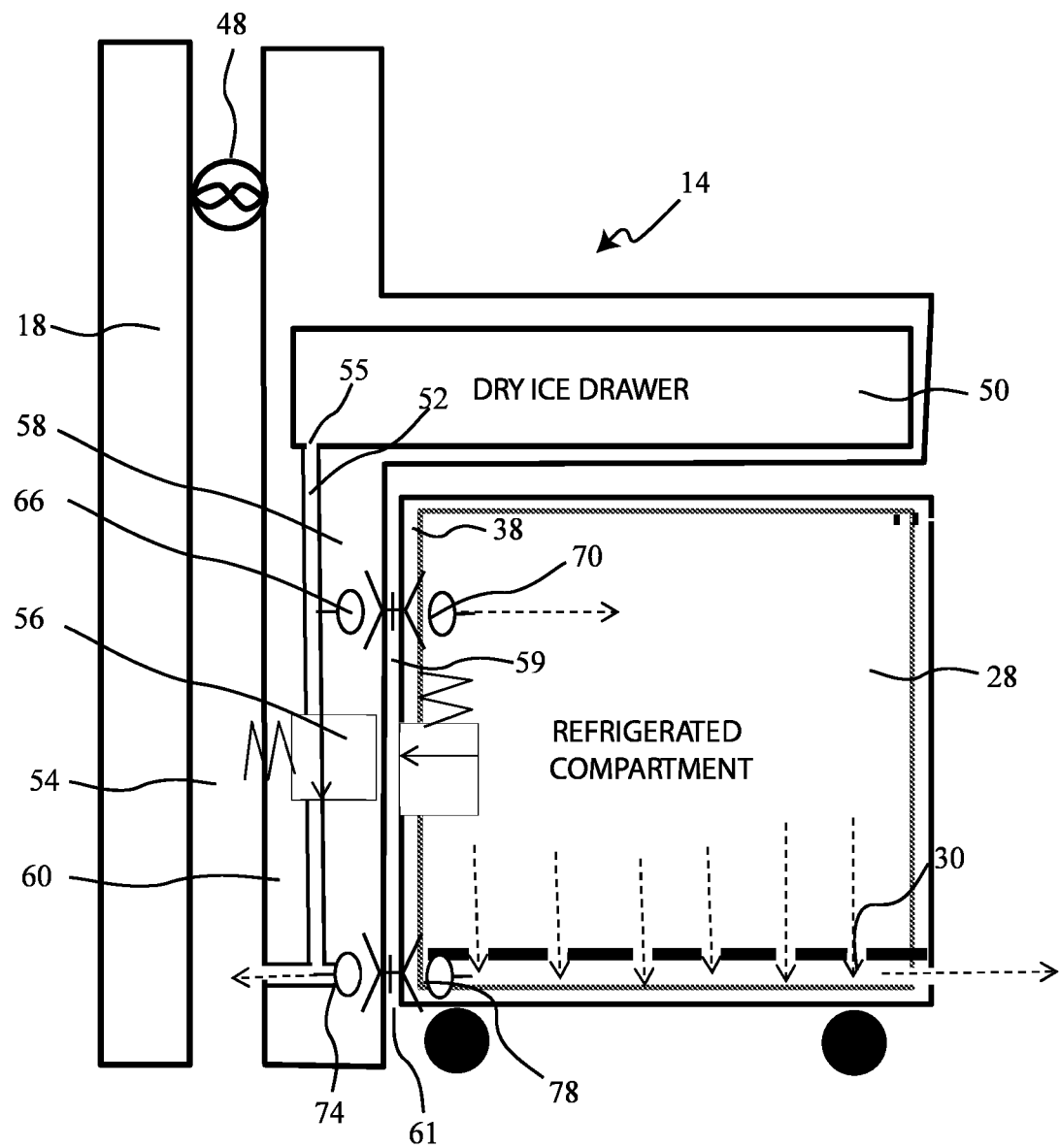
FIG. 4A is a schematic side section view of a second embodiment with a dry ice draw in the galley counter and a galley cart engaged to the galley vent system.
Figure 5A:
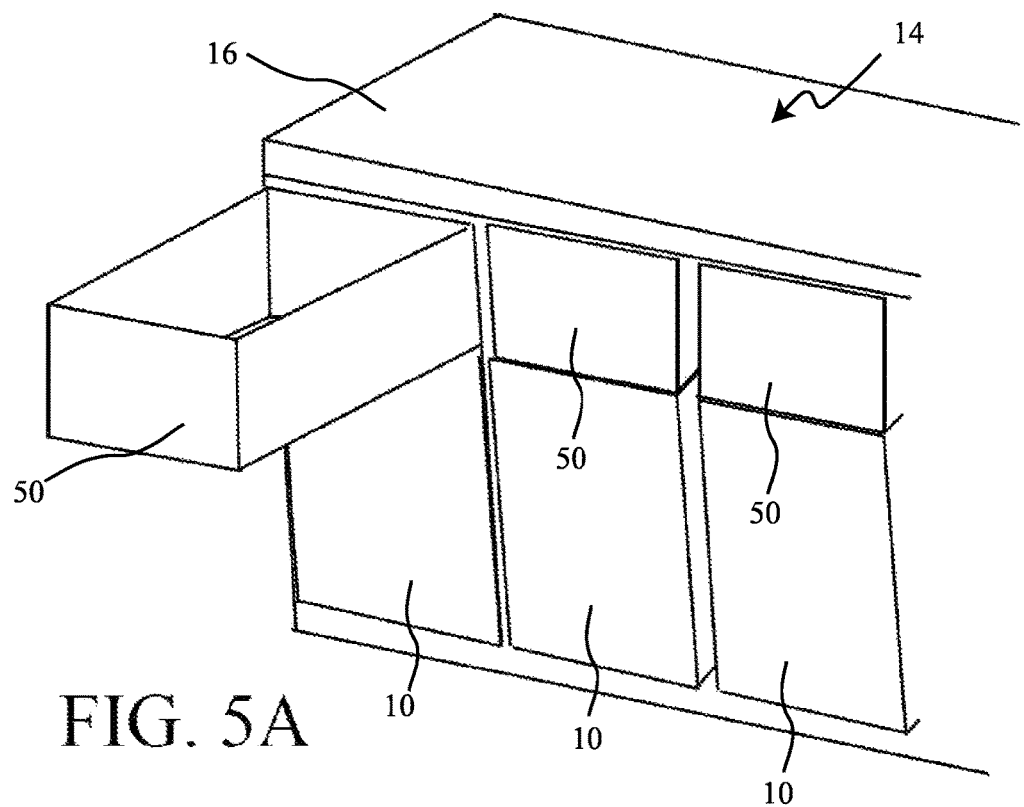
FIG. 5A is an pictorial view of the galley counter and cart storage area showing the dry ice drawers in the galley counter.

A second embodiment is shown in FIG. 4A wherein the dry ice compartment is provided as a dry ice drawer 50 in the galley 14. The dry ice drawer is connected to a plenum 52 configured to receive sublimated gas from the dry ice contained in the drawer through one or more apertures 55 in the drawer. As in the prior embodiment, a ventilation system including a vent 54 is present in the galley wall 18. An excess pressure relieve valve 56 connects the plenum 52 with the vent 54 to avoid overpressure in the plenum and dry ice drawer. For exemplary embodiments a simple spring loaded ball valve may be employed. As shown in FIG. 5A, the galley 14 may accommodate multiple carts 10 in the storage area 12. The dry ice drawers 50 are conveniently mounted beneath the galley counter 16. While shown as multiple drawers each aligned with one cart, a single drawer or drawers for multiple carts may be employed with interconnection of the plenum and vent for multiple carts.

Figure 5B:
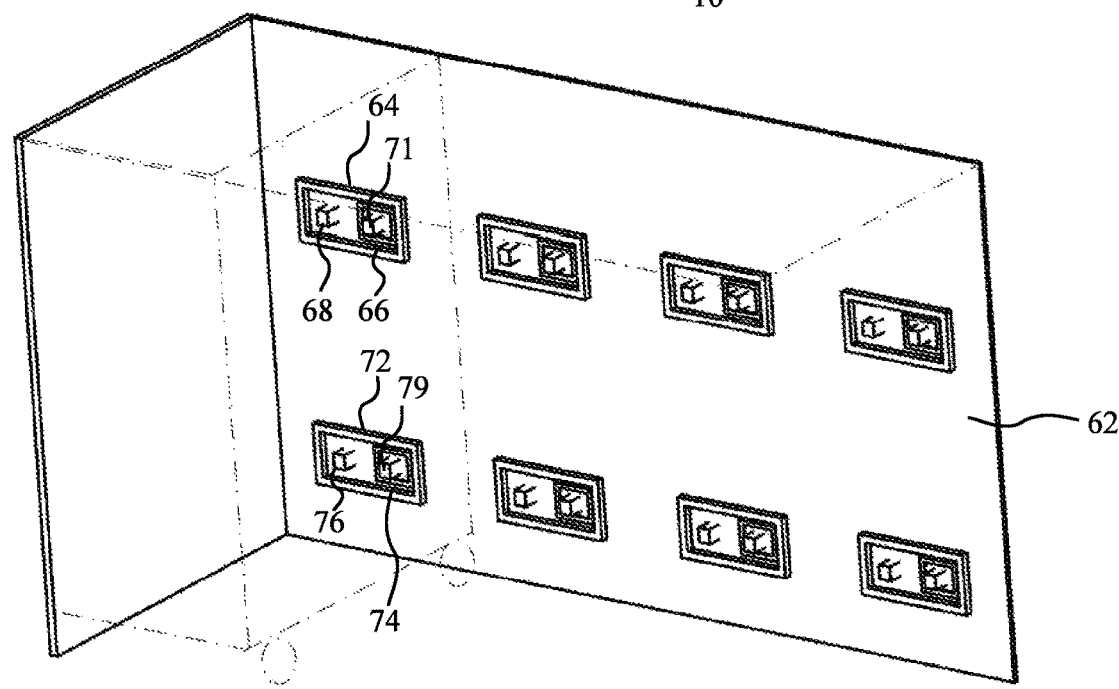
FIG. 5B is an pictorial view of the galley with the counter and an example cart shown in phantom to display the vent system interface.
Figure 6:
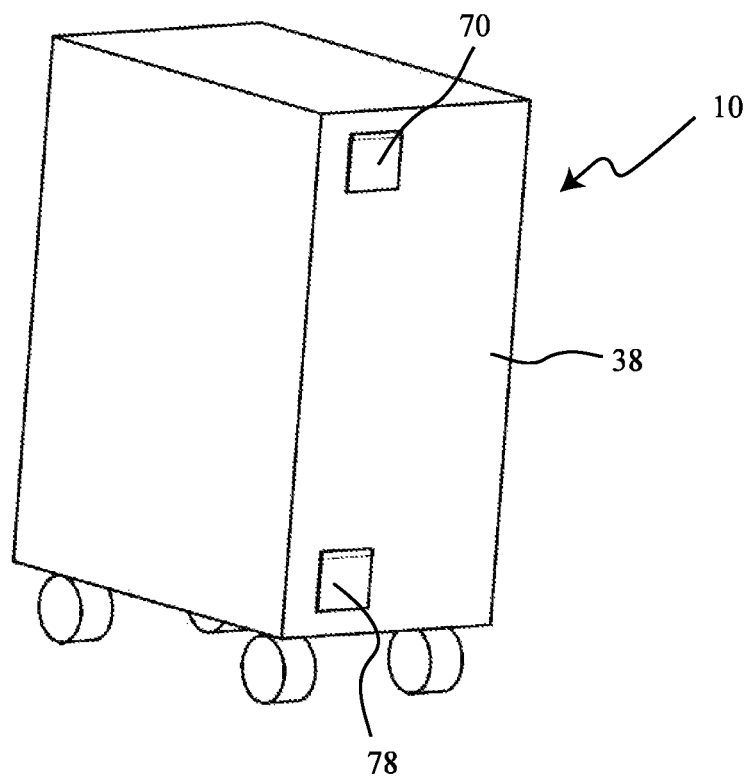
FIG. 6 is a rear pictorial view of an example galley cart of the second embodiment.

Returning to FIG. 4A, an interconnection system in the cart and galley provides for flow of sublimated CO2 from the plenum 52 into the refrigeration compartment 28 in the cart and venting of sublimation flow from the cart into the vent 54 with the cart docked in the galley. The interconnection system incorporates parallel adjacent flow doors in the cart rear wall 38 and plenum wall 58 acting as a first flow valve (generally identified as element 59 in FIG. 4A) configured to allow sublimated gas to flow from the dry ice compartment in to the refrigeration compartment and parallel adjacent flow doors in cart rear wall 38 and vent wall 60 acting as a second flow valve (element 61 in FIG. 4A) configured to allow sublimated gas to flow from the refrigeration compartment into the ventilation system. As shown in FIG. 5B the galley end wall 62, which for the embodiment shown includes the plenum wall 58 and vent wall 60, has a first peripheral seal 64 surrounding a sublimation transfer door 66 and a mating bumper 68 for a sublimation inlet door 70 on the cart rear wall 38 as shown in FIG. 6. The transfer door 66 includes a bumper 71 which engages the rear wall 38 of the cart as will be described in greater detail subsequently. A second peripheral seal 72 (seen in FIG. 5B) surrounds a sublimation receiver door 74 and a second mating bumper 76 for a vent door 78 on the cart rear wall 38 (seen in FIG. 6). The receiver door 74 includes a bumper 79 which engages the rear wall 38 of the cart as will be described in greater detail subsequently. Interconnection systems as described are present for each galley cart received in the galley as shown in FIG. 5B.

As shown in FIG. 4A with the cart engaged in the galley, transfer door 66 and inlet door 70, and receiver door 74 and vent door 78 are opened by engagement of the respective bumpers. Sublimating CO2 is thereby allowed to flow from the dry ice drawer 50 through the plenum 52 into the cart 10 flowing through the refrigeration compartment 28 by gravity acting on the denser sublimate. The sublimated CO2 then flows through the vent door 78, located in a bottom portion of the refrigeration compartment, and receiver door 74 into the galley vent 54. A fan 48 may be employed as previously described with respect to the first embodiment for exhausting CO2 from the vent outside the aircraft. A metering pocket for control of sublimation flow through the refrigeration compartment, as described with respect to the first embodiment, may also be employed with the vent door 78 opening into the pocket.

Figure 4B:
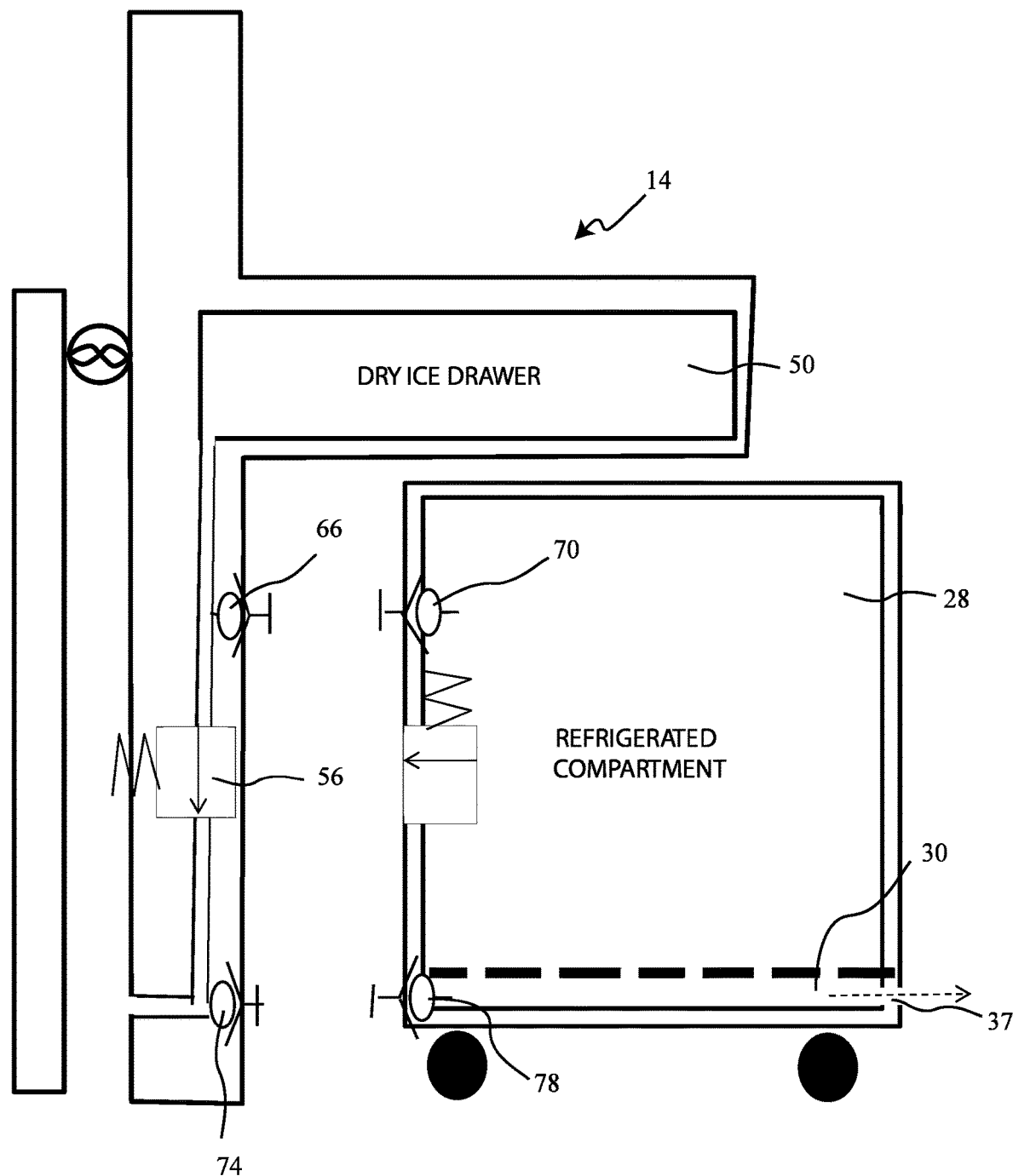
FIG. 4B is a schematic side section view of the second embodiment disengaged from the galley.

As represented in FIG. 4B, with the cart disengaged from the galley 14, the transfer door 66 from the plenum 52 and inlet door 70 in the cart are disengaged and closed. Similarly, the receiver door 74 and vent door 78 in the cart are disengaged and closed. The relief valve 56 provides venting of the dry ice drawer 50 into the vent 54 if required. As with the prior embodiment, a vent 37 may be employed for flow of CO2 sublimate from the refrigeration compartment 28.

Figure 4C:
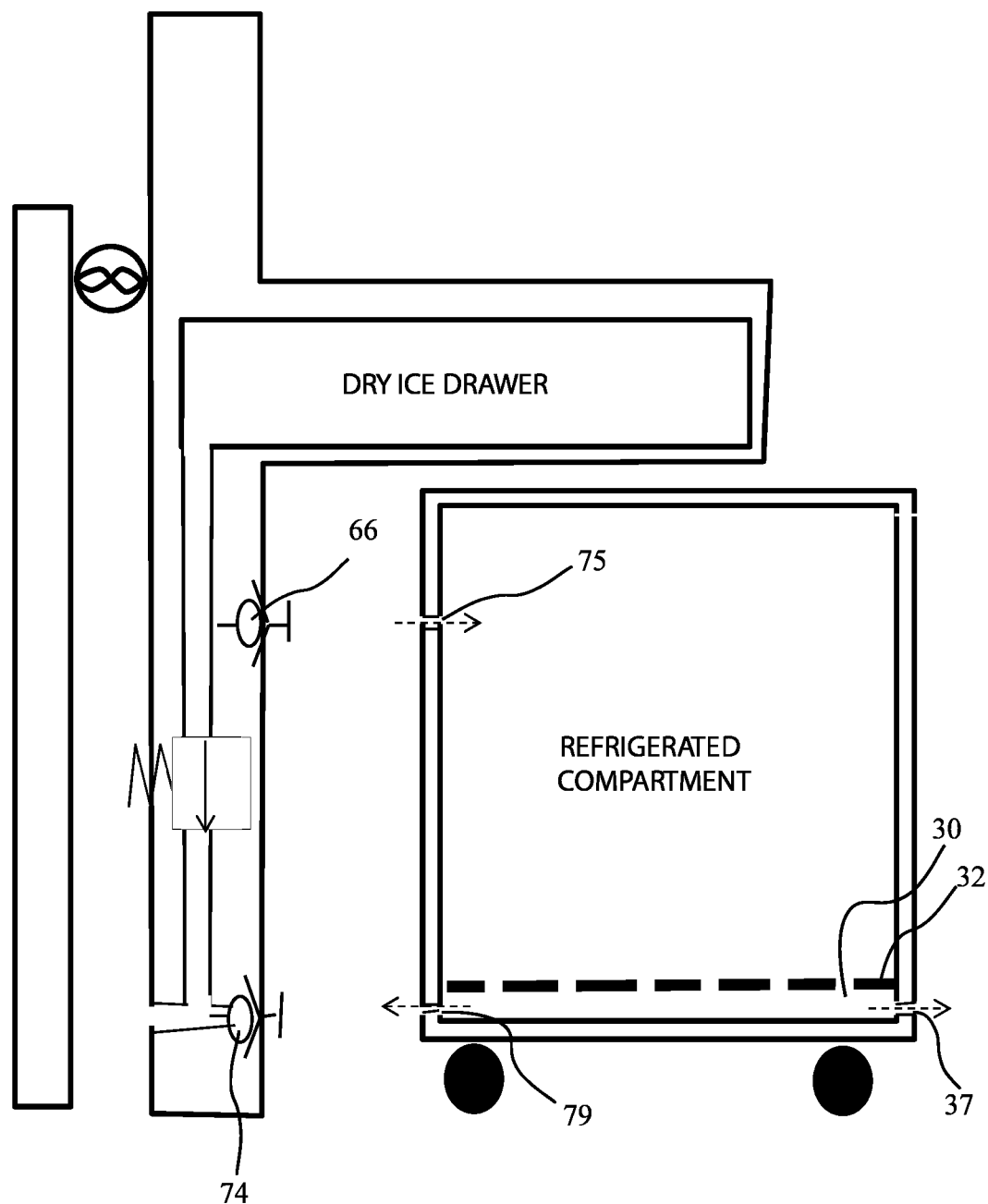
FIG. 4C is a schematic side section view of the second embodiment without companion inlet and vent doors in the cart.

As represented in FIG. 4C, the galley cart may eliminate the receiver door and vent door and incorporate inlet apertures 75 and vent apertures 79 which are positioned adjacent the transfer door 66 and receiver door 74 with the galley in a docked position for flow of sublimate into and out of the cart. Additionally, as described with respect to the embodiments of FIGS. 1A-1C, the embodiments of FIGS. 4A-4C may eliminate the grill 32 from the sublimation pocket 30 in certain alternative embodiments.

Figure 7:
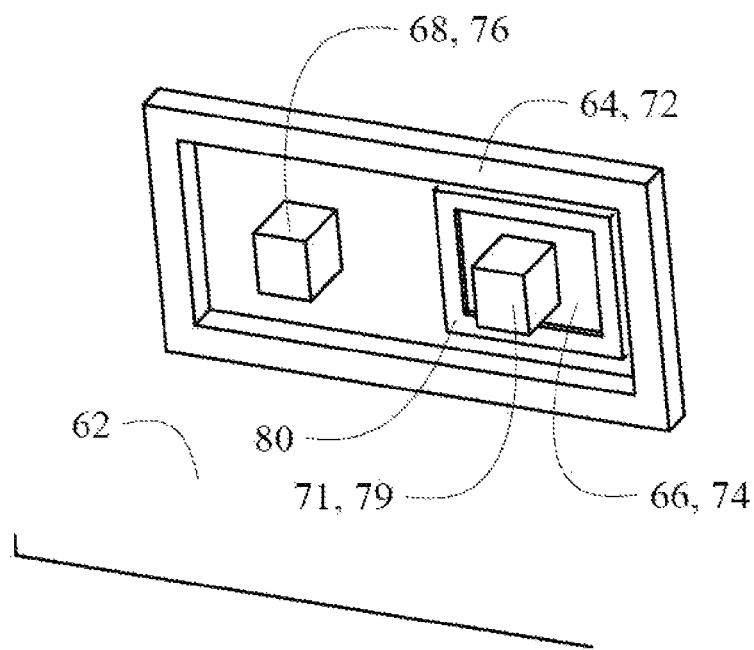
FIG. 7 is a detailed pictorial view of the galley end wall from within the cart storage compartment showing the vent seal, the cart vent door engagement element and the galley vent door with integral engagement element.
Figure 8:
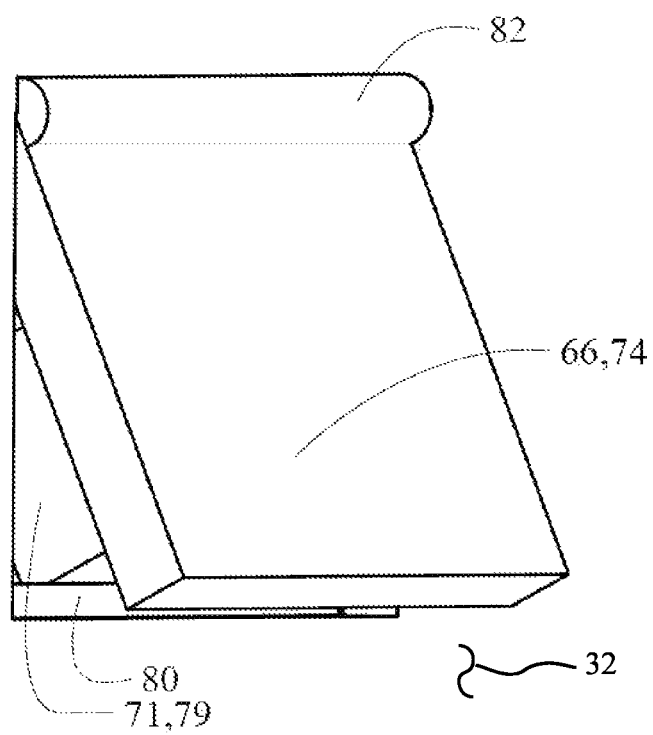
FIG. 8 is a detailed pictorial view of the galley end wall and vent interface door from within the vent with the door in the open position.

Details of the interconnection system elements are shown in FIGS. 7-10. As shown in FIG. 7, for either the sublimation inlet or venting outlet, the peripheral seal 64, 72 on the galley wall surrounds the sublimation transfer door 66 or sublimation receiver door 74 and the mating bumper 68, 76 for a sublimation inlet door 70 or vent door 78 on the cart rear wall 38. The peripheral seal may employ resilient rubber or foam with sufficient crush and rebound for frequent engagement and disengagement of the cart. The transfer door 66 and receiver door 74 include a bumper 71, 79 which engages the rear wall 38 of the cart as will be described in greater detail subsequently. A door seal 80 surrounds the transfer door 66 or receiver door 74 to receive and seal the door in the closed position. A pliable rubber frame or similar material may be employed for the seal. As shown in FIG. 8, the transfer door 66 or receiver door 74 are attached to the rear wall 38 with a hinge 82. Positioning of the hinge on the upper edge of the door 66, 74 allows the weight of the door to return the door to the closed position when the bumper is disengaged from the cart wall. A supplemental spring to urge the door to the closed position may be employed or the door may be of pliable material allowing the hinge to be a living hinge with resilient return force of the door material assisting the gravity return and seal. As viewed from inside the plenum 52 or vent duct 54, when the cart 10 is mated in the galley cart storage area 12 with rear wall 38 pressed against the peripheral seals 64, 72, bumper 71, 79 engages the rear wall and opens the door as shown.

Figure 9:
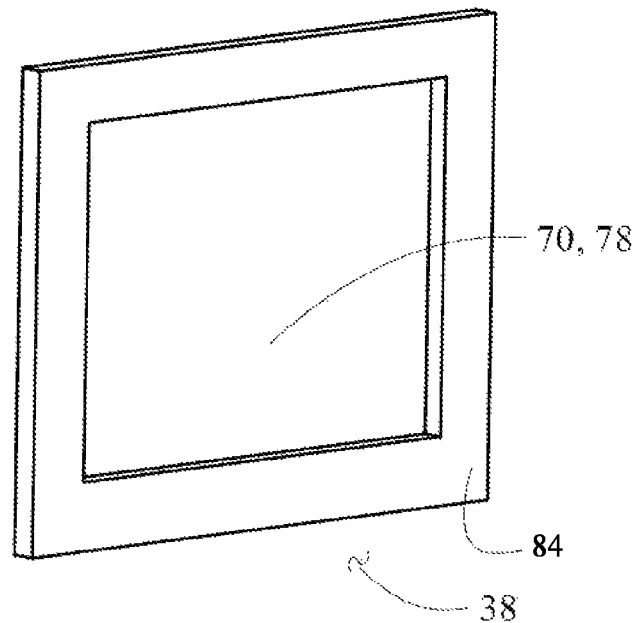
FIG. 9 is a detailed outside pictorial view of the cart end wall showing the vent interface door in the closed position.
Figure 10:
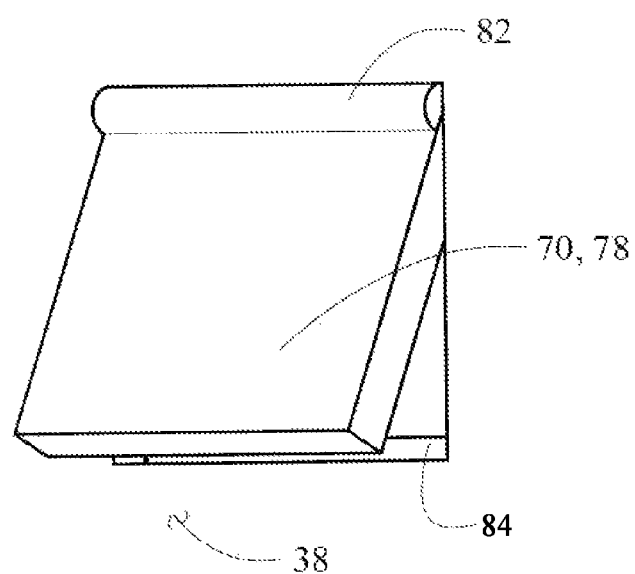
FIG. 10 is a detailed pictorial view of the cart end wall from within the cart showing the vent interface door in the open position.

As shown in FIGS. 9 and 10, the inlet and vent doors, 70, 78 in the rear wall 38 of the cart 10 are also surrounded by a door seal 84 and are supported by a hinge 86. Upon engagement of the cart rear wall 38 with the peripheral seals 64, 72, the bumpers 68, 76 engage the doors 70, 78 to urge them open. FIG. 9 shows the doors 70, 78 from an exterior view of the cart in a closed position with the cart disengaged from the peripheral seals and FIG. 10 shows the doors 70, 78 from an interior view in the cart in an open position with the cart engaged on the peripheral seals.

FIG. 11 shows from inside the cart the engaged cart inlet or vent door 70, 78 as opened by the mating bumper 68, 76. FIG. 12 shows from inside the plenum or vent the transfer or receiver door 66, 74 with the associated bumper 71, 79 engaging the cart rear wall to open the door. While the first and second flow valves 59, 61 are described for the embodiments herein as parallel opening doors, alternative interconnection systems allowing flow communication between the plenum and refrigeration compartment and the refrigeration compartment and the vent which engage upon docking of the cart in the galley may be employed in alternative embodiments.

For either embodiment of the galley cart described above, the distribution of flow of $CO_2$ sublimate through the refrigeration compartment 28 may be enhanced by directional control of entering and exiting flow. As shown in FIG. 13A, sublimating $CO_2$ enters from the upper portion of the cart 10 (either from the dry ice drawer in the cart as described with respect to the first embodiment above, or through the inlet door in the second embodiment), and flows under gravity downward into the refrigeration compartment 28. As shown in detail in FIGS. 13B and 13C, lower side channels 90 extending from front to rear within the side walls 92 and located near the bottom of the cart, have perforated grates 94 in flow communication with the refrigeration compartment 28 to receive the flow of $CO_2$ sublimate. The side channels 90 may then merge into a lower rear channel 96 acting as the accumulation pocket in flow communication with the vent door 78 for flow through the mating receiver door 74 for flow into the ventilation system as previously described.

Similarly for implementations of the second embodiment as described above for a dry ice drawer in the galley, as shown in FIGS. 14A-14D upper channels 98 may be provided running from front to rear in the side walls 92 near the top of the cart 10 with perforated grills 100 communicating with the refrigeration compartment to distribute flow of incoming $CO_2$ sublimate as shown in FIGS. 14B and 14C. As shown in FIG. 14D, the upper channels 98 may extend forward from and communicate with an upper inlet channel 102 receiving $CO_2$ sublimate from the transfer door 66 in the galley and inlet door 70 in the cart acting as the first valve as previously described. An alternative configuration for distribution of incoming $CO_2$ sublimate in the cart for the second embodiment is show in FIGS. 15A-15C. Sublimate flowing through transfer door 66 and inlet door 70 as shown in FIG. 15C is introduced into an upper pocket 104 having a perforated bottom grill 106, shown in FIGS. 15B and 15C for flow communication with the refrigeration compartment. Flow of $CO_2$ sublimate is distributed along the top of the cart in upper pocket 104 to provide enhanced distribution of sublimate into the refrigeration compartment 28.

The perforated grills shown and described herein may incorporate any forming or fabrication method to provide an array of apertures with size, shape and distribution on the grill predetermined to provide the desired flow distribution of $CO_2$ sublimate.

Figure 16:
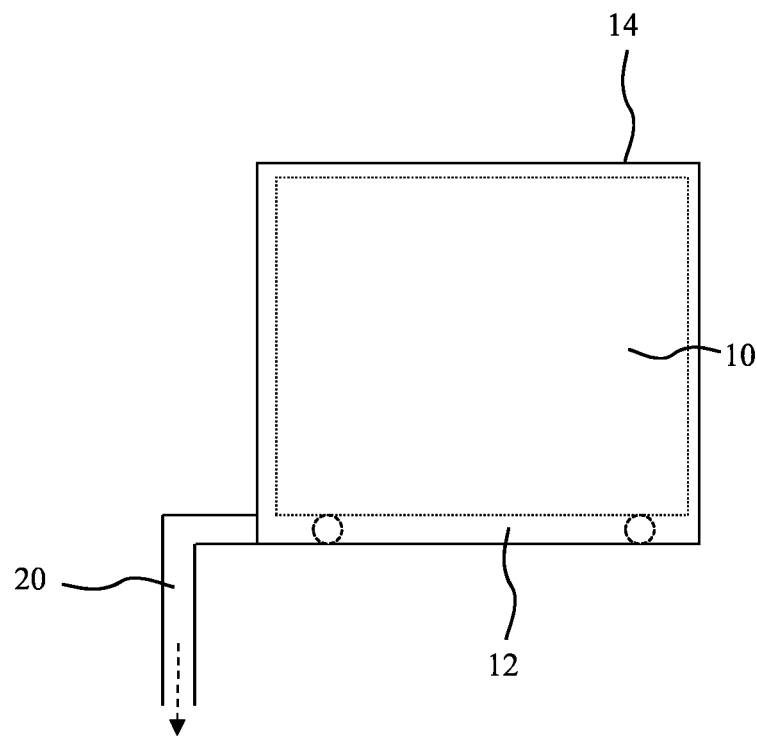
FIG. 16 is a side schematic view of a galley cart storage system vent.
Figure 17:
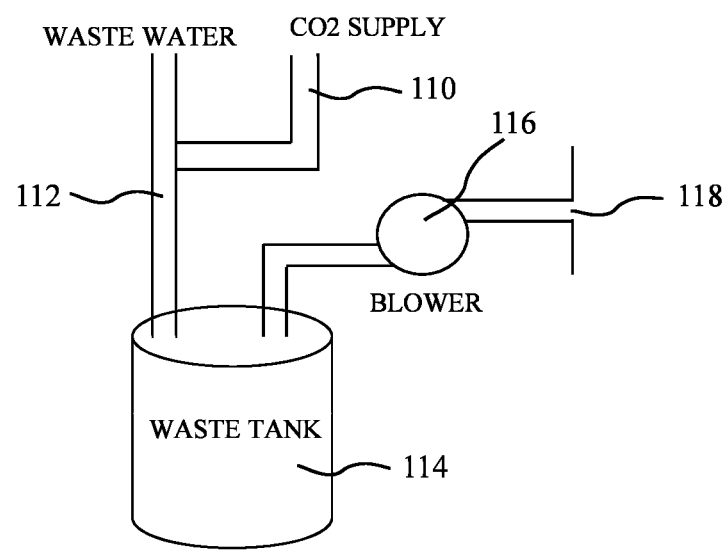
FIG. 17 is a block diagram view of an embodiment employing CO2 from the galley cart vent system for wastewater treatment with exhaust overboard via the wastewater vent.

$CO_2$ sublimate exhausted from the galley carts into the galley vent system as described for the embodiments above may be provided through a duct system and employed as an alternative processing or working fluid in various systems on board the aircraft. As shown generally in FIG. 16, the galley cart 10 docked in the cart storage area 12 in the galley 14 provides venting $CO_2$ sublimate from the refrigeration compartment or dry ice compartment into the vent 20. In a direct venting scheme, the vent 14 may be in flow communication with and directed into the general galley vent with a fan 48 as described in the embodiments of FIGS. 1A-1C and 4A-4C. An alternative configuration is shown in FIG. 17 in which $CO_2$ from the vent 20 is in flow communication with and supplied through conduit 110 into a wastewater inlet 112 in the aircraft wastewater system. The $CO_2$ entrained into the wastewater flowing into waste tank 114 assists in sanitizing the waste water effluent. The $CO_2$ sublimate and waste tank vapor may then be withdrawn from the waste tank 114 with a blower 116 to an overboard vent 118. The blower 116 may provide the pressure differential necessary for directing flow of $CO_2$ sublimate from the galley ventilation system.

Figure 18A:
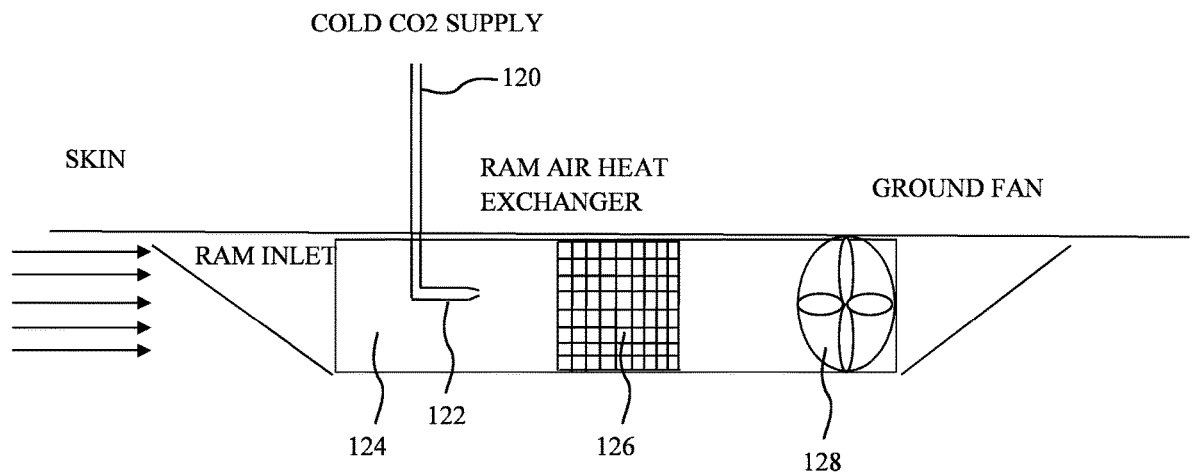
FIG. 18A is a top section view of an exemplary ram inlet with CO2 injection from the galley cart vent system.

In an alternative application, $CO_2$ sublimate from the vent 20 may be supplied through an appropriate conduit 120 as shown in FIG. 18A in flow communication with a heat exchanger. Conduit 120 may be insulated to maintain the cold temperature of the $CO_2$. For the example shown, conduit 120 terminates in a nozzle 122 in the flow path of ram inlet 124. The ram inlet incorporates a heat exchanger 126 which may be employed for system cooling or cabin environmental control. In operation at altitude, cold external air provides working fluid for desired cooling in the heat exchanger 126. $CO_2$ sublimate from nozzle 122 upstream of the heat exchanger 126 provides supplemental cooling. During ground operation where external air inlet to the ram inlet is negligible or of warmer temperatures, the $CO_2$ sublimate from the nozzle 122 may provide primary cooling working fluid to the heat exchanger 126 with supplemental flow pressurization from a fan 128.

Figure 18B:
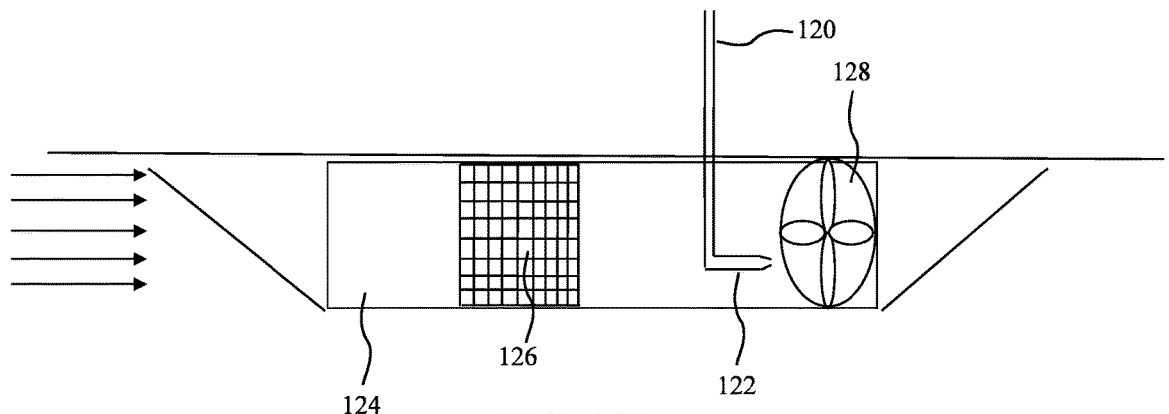
FIG. 18B is a top section view of the exemplary ram inlet with CO2 injection from the galley cart vent system at an alternative flow location; and, FIG. 19 is a flow chart of a cart cooling method enabled by the disclosed embodiments.

An alternative configuration for inlet of $CO_2$ into the ram inlet 124 is shown in FIG. 18B wherein the nozzle 122 is downstream of the heat exchanger 126. In this configuration $CO_2$ exhausting from the nozzle 122 provides additional thrust to the flow in and exiting the ram inlet thereby providing energy/thrust recovery for the aircraft in flight.

Figure 19:
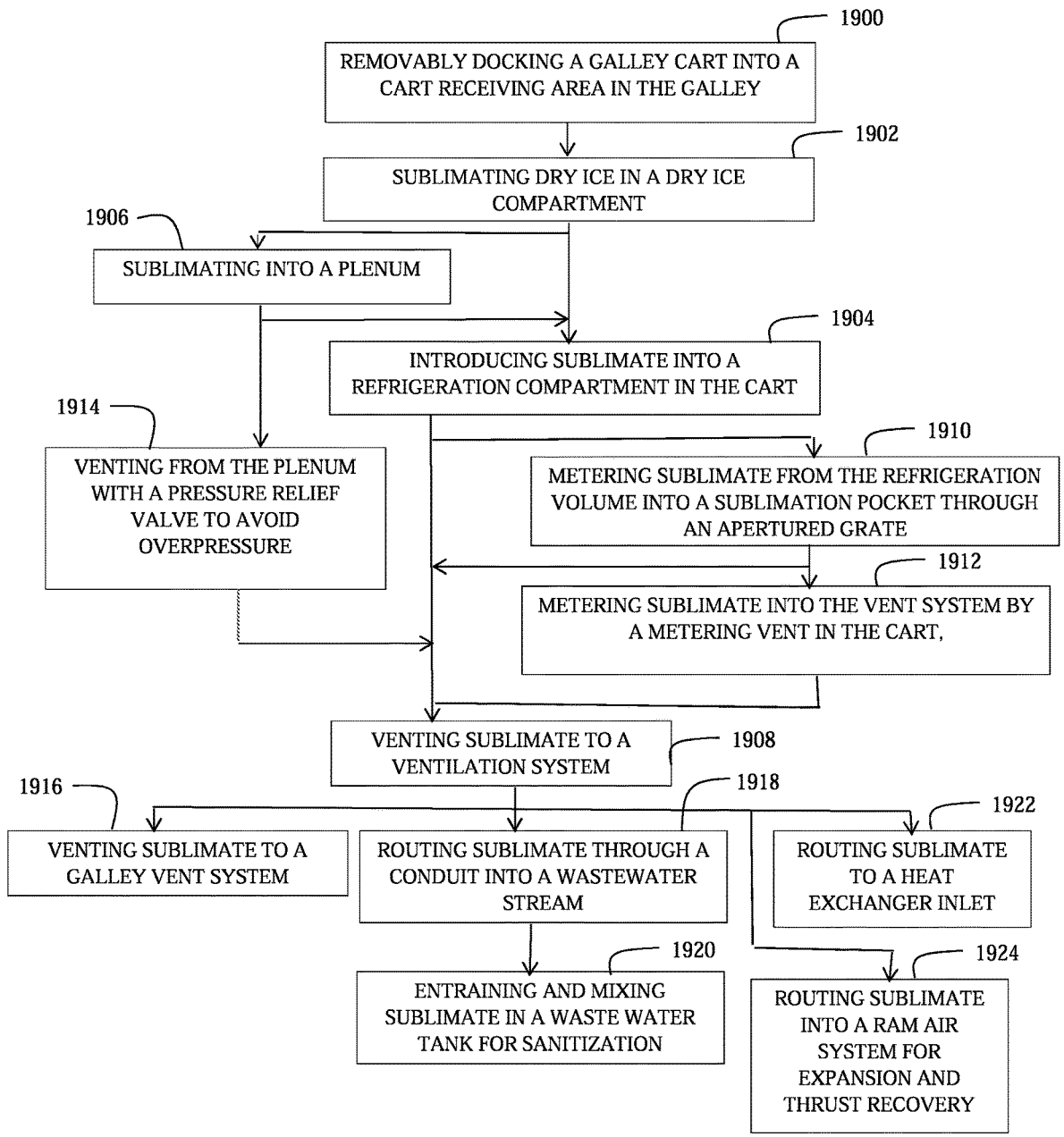

The embodiments disclosed provide a method for sublimation cooling of a galley cart refrigeration compartment as shown in FIG. 19. A galley cart is removably docked into a cart receiving area in the galley, step 1900. Dry ice is sublimated in a dry ice compartment, step 1902, and sublimate is introduced into a refrigeration compartment in the cart, step 1904. The introduction of sublimate into the cart can be accomplished by providing the dry ice in an integral dry ice compartment in the cart and allowing the sublimate to flow through a perforated lower wall in the compartment into the refrigeration compartment. Alternatively, a dry ice drawer in the galley may be employed which allows sublimation into a plenum which is interconnected to the refrigeration compartment, step 1906, upon docking of the cart. Venting of sublimate to a ventilation system, step 1908, is also accomplished by interconnection of the refrigeration volume to a galley vent upon docking of the cart. Sublimate may be metered from the refrigeration volume by metering into a sublimation pocket through an apertured grate, step 1910. Sublimate may also be metered into the vent system by a metering vent in the cart, step 1912. Sublimate may also be vented from the plenum with a pressure relief valve into the vent to avoid overpressure, step 1914.

Sublimate from the vent may be exhausted overboard through a galley vent, step 1916, or employed for supplemental system applications. By routing sublimate through an appropriate conduit into a wastewater stream, step 1918, for entrainment and mixing in a waste water tank, step 1920, supplemental sanitizing effects may be achieved. Sublimate and vapor from the waste water tank may then be vented overboard. Alternatively, sublimate may be routed to a heat exchanger inlet, step 1918, as supplemental cooling working fluid. As yet another alternative, sublimate may be routed into a ram air system for expansion and thrust recovery, step 1920.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for dry ice cooling of a galley cart, the method comprising: removably docking the galley cart into a cart receiving area in a galley; sublimating dry ice in a dry ice compartment to form a cold $CO_2$ sublimate; introducing the cold $CO_2$ sublimate into a refrigeration compartment in the galley cart, the refrigeration compartment in flow communication with the dry ice compartment and located to receive downward gravity flow of the cold $CO_2$ sublimate for cooling the refrigeration compartment; and venting the cold CO2 sublimate to a ventilation system by interconnection of the refrigeration compartment to a galley vent upon docking of the galley cart.

2. The method of claim 1 further comprising metering the cold $CO_2$ sublimate from the refrigeration compartment by a metering into a sublimation pocket through an apertured grate.

3. The method of claim 1 further comprising metering the cold $CO_2$ sublimate into the ventilation system through a metering vent in the galley cart.

4. The method of claim 1 wherein the step of introducing the cold $CO_2$ sublimate into the refrigeration compartment comprises: introducing the dry ice in an integral dry ice compartment in the galley cart; and flowing sublimated $CO_2$ through a perforated lower wall in the integral dry ice compartment into the refrigeration compartment.

5. The method of claim 1 wherein the step of introducing the cold $CO_2$ sublimate into the refrigeration compartment comprises: introducing the dry ice into a drawer in the galley; allowing sublimation into a plenum; and interconnecting the plenum to the refrigeration compartment upon docking of the galley cart.

6. The method of claim 1 further comprising exhausting the cold $CO_2$ sublimate from the ventilation system overboard through the galley vent.

7. The method of claim 1 further comprising: routing the cold $CO_2$ sublimate through a conduit into a wastewater stream; entraining the cold $CO_2$ sublimate into wastewater in the wastewater stream; and venting the cold $CO_2$ sublimate and vapor from a wastewater tank overboard.

8. The method of claim 1 further comprising routing the cold $CO_2$ sublimate to a heat exchanger inlet as supplemental cooling working fluid.

9. The method of claim 1 further comprising: routing the cold $CO_2$ sublimate into a ram air system; and expanding the cold $CO_2$ sublimate for thrust recovery.

10. A method for dry ice cooling of a galley cart, the method comprising: removably docking the galley cart into a cart receiving area in a galley; sublimating dry ice in a first compartment configured to contain $CO_2$ sublimate as a primary working fluid; employing the $CO_2$ sublimate in a refrigeration compartment in flow communication with the first compartment and located to receive downward gravity flow of the $CO_2$ sublimate as the primary working fluid providing refrigeration for food in the refrigeration compartment; venting the $CO_2$ sublimate to a separate duct system in flow communication between a vent and a second system of a vehicle, said separate duct system configured for flow of the $CO_2$ sublimate as an alternative processing fluid or working fluid in the second system upon docking of the galley cart; and employing the $CO_2$ sublimate from the vent as an alternative processing fluid or working fluid in the second system.

11. The method of claim 10 further comprising metering the CO2 sublimate through the refrigeration compartment by a metering into a sublimation pocket through an apertured grate.

12. The method of claim 10 wherein the first compartment comprises an integral dry ice compartment in the galley cart and the step of sublimating dry ice in the first compartment initially comprises introducing dry ice into the integral dry ice compartment and the step of employing the $CO_2$ sublimate in the refrigeration compartment comprises: flowing sublimated $CO_2$ through a perforated lower wall in the integral dry ice compartment into the refrigeration compartment.

13. The method of claim 12 further comprising metering the $CO_2$ sublimate into the separate duct system by a metering vent in the galley cart.

14. The method of claim 13 wherein the step of venting the $CO_2$ sublimate to the separate duct system comprises: urging a rear wall of the galley cart against a peripheral seal surrounding a vent door, said vent door suspended by a hinge and in flow communication with the separate vent duct; contacting a bumper extending from the vent door with the rear wall of the galley cart, the bumper having an offset providing a contact distance for the galley cart rear wall before the wall engages the peripheral seal whereby when the cart rear wall is urged against the seal, the bumper engages the galley cart rear wall and urges the door into an open position.

15. The method of claim 10 wherein the step of employing the $CO_2$ sublimate in a refrigeration compartment comprises: introducing the dry ice into a drawer in the galley; allowing sublimation of $CO_2$ from the drawer into a plenum;

and interconnecting the plenum to the refrigeration compartment upon docking of the galley cart.

16. The method of claim 15 wherein interconnecting the plenum to the refrigeration compartment comprises: urging a rear wall of the galley cart against a galley end wall including a plenum wall and a vent wall, the galley cart rear wall having a sublimation inlet door and a sublimation vent door, the plenum wall having a first peripheral seal surrounding a sublimation transfer door, and the vent wall has a second peripheral seal surrounding a sublimation receiver door; engaging the rear wall of the galley cart with the first and second peripheral seals whereby a first bumper on the sublimation transfer door engages the rear wall of the galley cart and a second bumper on the galley end wall engages the sublimation inlet door on the galley cart rear wall, thereby urging the sublimation transfer door and sublimation inlet door into the open position.

17. The method of claim 16 wherein the step of receiving the $CO_2$ sublimate from the refrigeration compartment comprises: engaging the rear wall of the galley cart with the first and second peripheral seals whereby a third bumper on the galley end wall engages the sublimation vent door on the galley cart rear wall, and a fourth bumper on the sublimation receiver door engages the galley cart rear wall, thereby urging the sublimation vent door and the sublimation receiver door.

18. The method of claim 17 further comprising metering the $CO_2$ sublimate into the separate duct system by a metering vent in the galley cart.

19. The method of claim 10 further comprising exhausting the $CO_2$ sublimate from the second system overboard through a vent.

20. The method of claim 12 further comprising relieving excess pressure through an excess pressure relief valve in communication with the refrigeration compartment or the integral dry ice compartment.

\* \* \* \* \*